(12) United States Patent
Suzuki et al.

(10) Patent No.: US 7,713,126 B2
(45) Date of Patent: May 11, 2010

(54) VIDEO GAME CONTROL PROGRAM AND VIDEO GAME DEVICE

(75) Inventors: Yu Suzuki, Tokyo (JP); Kensaku Maeda, Tokyo (JP)

(73) Assignee: Sega Corporation, Tokyo (JP)

( * ) Notice: Subject to any disclaimer, the term of this patent is extended or adjusted under 35 U.S.C. 154(b) by 874 days.

(21) Appl. No.: 11/481,579

(22) Filed: Jul. 6, 2006

(65) Prior Publication Data
US 2007/0010325 A1    Jan. 11, 2007

(30) Foreign Application Priority Data
Jul. 6, 2005    (JP)    ............... 2005-197343

(51) Int. Cl.
*G06F 17/00*    (2006.01)
*G06F 19/00*    (2006.01)
(52) U.S. Cl. .............. 463/31; 463/1; 463/7; 463/9; 463/30; 463/32; 463/33; 463/42
(58) Field of Classification Search ............... 463/1, 463/7, 9, 30–33, 42
See application file for complete search history.

(56) References Cited

U.S. PATENT DOCUMENTS

| | | | | |
|---|---|---|---|---|
| 4,357,014 A | * | 11/1982 | Baer et al. ............ | 463/37 |
| 5,848,934 A | * | 12/1998 | Shiels et al. ............ | 463/9 |
| 6,388,688 B1 | * | 5/2002 | Schileru-Key ............ | 715/854 |
| 6,821,206 B1 | * | 11/2004 | Ishida et al. ............ | 463/43 |
| 6,966,831 B2 | * | 11/2005 | Miyaki et al. ............ | 463/1 |
| 7,411,594 B2 | * | 8/2008 | Endo et al. ............ | 345/633 |
| 2003/0032478 A1 | * | 2/2003 | Takahama et al. ............ | 463/30 |
| 2003/0048849 A1 | * | 3/2003 | Tomita et al. ............ | 375/240.25 |
| 2004/0254019 A1 | * | 12/2004 | Riendeau et al. ............ | 463/42 |
| 2007/0060341 A1 | * | 3/2007 | Lind ............ | 463/31 |

FOREIGN PATENT DOCUMENTS

JP    11047447 A    *    2/1999
JP    2002315956 A    *    10/2002

* cited by examiner

*Primary Examiner*—Peter DungBa Vo
*Assistant Examiner*—Milap Shah
(74) *Attorney, Agent, or Firm*—Ladas & Parry LLP

(57) ABSTRACT

In a video game device which performs a video game wherein a game character or unit moves through a plurality of paths including a plurality of branch points according to an instruction of a player, a first movement control unit displays branch-direction indications enabling the player to select one of a plurality of first branch directions at a branch point on a path in the video game, so that a selected one of the plurality of first branch directions is received from the player. A second movement control unit displays preceding-branch-direction indications enabling the player to select, in advance, one of a plurality of second branch directions at a branch point on a following path in the selected first branch direction, so that a selected one of the plurality of second branch directions is received from the player.

8 Claims, 19 Drawing Sheets

VIDEO GAME CONTROL PROGRAM AND VIDEO GAME DEVICE

BACKGROUND OF THE INVENTION

1. Field of the Invention

The present invention relates to a video game control program and a video game device.

2. Description of the Related Art

There is known a video game of the type in which the expression by a vast map is possible and a plurality of paths with a plurality of branch points exist in the middle of the map. In the video game of this type, in accordance with the instructions of the player, a game character (or a group of game characters units) is moved through the paths, and a battle or the like is conducted between the game character and the enemy-side game character which will be encountered on the way.

Conventionally, the move instructions in the video game of this kind are inputted from an input unit provided with buttons, a joystick, a mouse, or a touch panel being operated by the player. There are two movement control methods. The first movement control method is to continuously instruct the direction of movement of the game character or unit from the current position to the destination. The second movement control method is to specify a next destination of the game character or unit on the visual field image or the map image such that no input operation to the buttons or the like is needed until the specified next destination is reached.

In the conventional video game device, the move instructions for movement of the game character or unit are inputted as described above, but the following problems are pointed out.

In the case of the first movement control method, the input operation of the buttons etc. must be continued until the destination is reached, and there is a problem that the input operation of the buttons etc. becomes a serious burden for the player when performing a video game having a long movement path.

In the case of the second movement control method which specifies a next destination on the visual field image or the map image, the input operation of the buttons is slightly easier than that of the first movement control method. However, after the specified next destination is reached, it is necessary to again specify a further next destination on the visual field image or the map image. If many branch points appear on the plurality of paths, the next destination has to be specified frequently, and there is a problem that the operation to specify the next destination frequently becomes troublesome.

Moreover, in the case of the second movement control method which specifies a next destination on the map image, specifying a distant position considerably distant from the current position is permitted. However, in such a case, the system (video game program) automatically sets up an intermediate path according to the shortest path method or the like, and it is difficult to move the game character or unit along a desired movement path so as to match the player's intension.

SUMMARY OF THE INVENTION

According to one aspect of the invention, there is provided an improved video game device in which the above-mentioned problems are eliminated.

According to one aspect of the invention there is provided one of a video game device and a video game control program which are adapted for enabling the player to freely select the following movement path of the game character or unit so as to match the player's intension, with the easily inputted operation.

In an embodiment of the invention which solves or reduces one or more of the above-mentioned problems, there is provided a computer-readable program which, when executed by a computer, causes the computer to perform a video game control process for use in a video game wherein a game character or unit moves through a plurality of paths including a plurality of branch points according to an instruction of a player, the process comprising: displaying branch-direction indications enabling the player to select one of a plurality of first branch directions at a branch point on a path in the video game, so that a selected one of the plurality of first branch directions is received from the player; and displaying preceding-branch-direction indications enabling the player to select, in advance, one of a plurality of second branch directions at a branch point on a following path in the selected first branch direction, so that a selected one of the plurality of second branch directions is received from the player.

The above-mentioned computer-readable program may be configured so that, when another of the plurality of second branch directions different from the selected second branch direction is selected, the selection of one of the plurality of second branch directions is changed to the another of the plurality of second branch directions.

The above-mentioned computer-readable program may be configured so that, when the selected second branch direction is selected again, the selection of one of the plurality of second branch directions is canceled.

The above-mentioned computer-readable program may be configured so that the process further comprises displaying forward/backward direction indications enabling the player to select one of forward and backward directions of the game character or unit, so that a selected one of the forward and backward directions is received from the player.

The above-mentioned computer-readable program may be configured so that, when opposite one of the forward/backward direction indications to a direction of movement of the game character or unit is selected, the direction of the movement is reversed and the selected one of the plurality of second branch directions at the branch point on the following path is canceled.

The above-mentioned computer-readable program may be configured so that the process further comprises displaying a stop-mark indication enabling the player to select one of stop and restart of movement of the game character or unit, so that a selected one of the stop and restart of the movement is received from the player.

The above-mentioned computer-readable program may be configured so that the process further comprises displaying a free-movement-area indication enabling the player to select one of a plurality of free-movement directions at a point in a free-movement area on the path, so that a selected one of the plurality of free-movement directions is received from the player.

In an embodiment of the invention which solves or reduces one or more of the above-mentioned problems, there is provided a video game device which performs a video game wherein a game character or unit moves through a plurality of paths including a plurality of branch points according to an instruction of a player, the video game device comprising: a first movement control unit displaying branch-direction indications enabling the player to select one of a plurality of first branch directions at a branch point on a path in the video game, so that a selected one of the plurality of first branch directions is received from the player; and a second movement control unit displaying preceding-branch-direction indications enabling the player to select, in advance, one of a plurality of second branch directions at a branch point on a following path in the selected first branch direction, so that a selected one of the plurality of second branch directions is received from the player.

According to the video game control program and the video game device of the invention, a move instruction for selecting a branch direction on a following path in the selected branch direction can be inputted beforehand by performing the preceding input with the easily inputted operation, and it is possible to freely select a following movement path from the current position of the game character or unit so as to match the player's intension.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of the preferred embodiments of the present invention with reference to the accompanying drawings.

Figure 1:
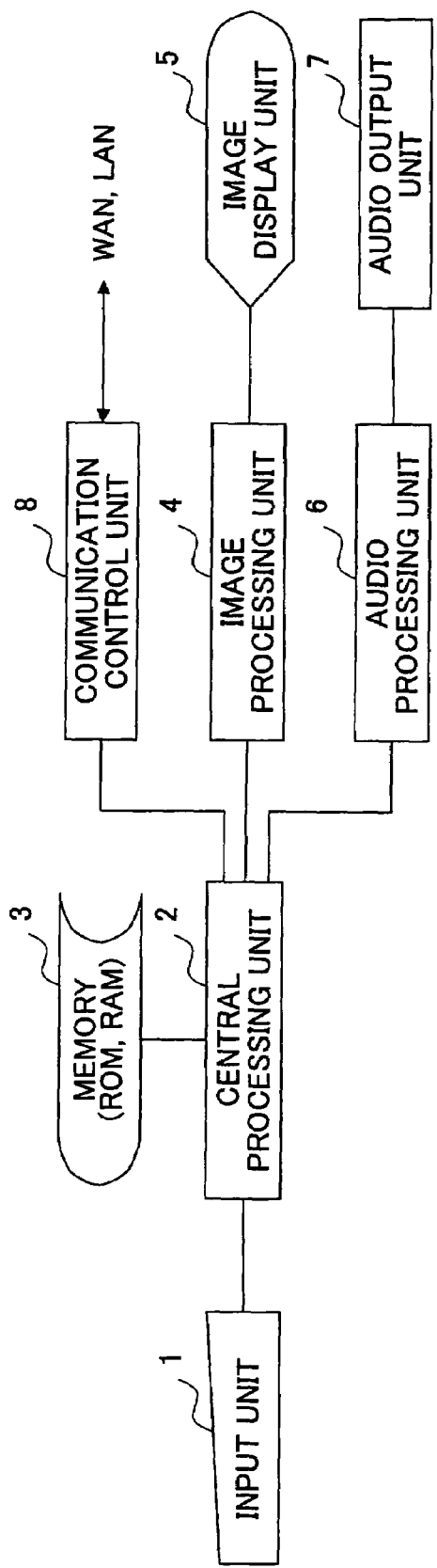
FIG. 1 is a block diagram showing the composition of a video game device in an embodiment of the invention.

FIG. 1 shows the composition of a video game device in an embodiment of the invention.

As shown in FIG. 1, the video game device of this embodiment comprises the following units 1 to 8.

The input unit 1 receives directly operation inputted by the player. The input unit 1 is provided with any of the touch panel, the buttons, the joystick and the like. The touch panel may be provided on a display screen of the image display unit 5 used as the video monitor.

The central processing unit 2 receives the operation input by the user on the input unit 1, and performs the main processing of the video game. The memory 3 includes a ROM (read-only memory) in which the pre-installed program and data which are used for the processing of the central processing unit 2 are stored, and a RAM (random access memory) used as the working area in the program execution.

The image processing unit 4 is provided to generate a game-related image according to the processing of the central processing unit 2. The image display unit 5 is provided as the video monitor to display the image generated by the image processing unit 4.

The audio processing unit 6 is provided to generate game-related sound according to the processing of the central processing unit 2. The audio output unit 7 is provided with a power amplifier and a loudspeaker to output or reproduce the sound generated by the audio processing unit 6.

The communication control unit 8 is provided so that this video game device may communicate with an external video game device via a WAN (wide area network) or LAN (local area network). In the case where it is not necessary to communicate with an external video game device, the communication control unit 8 may be omitted from the composition of the video game device in FIG. 1.

Figure 2:
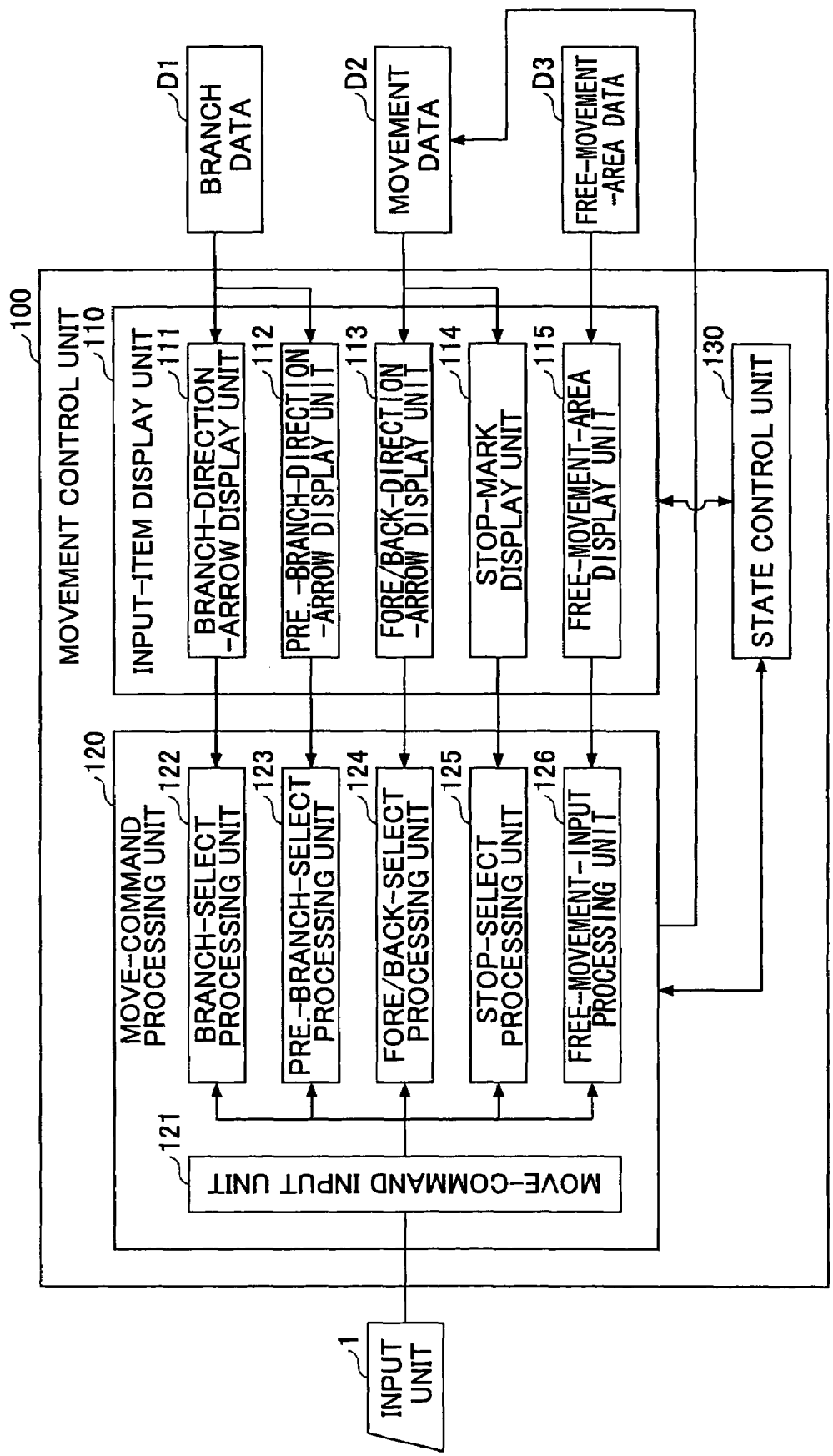
FIG. 2 is a block diagram showing the functional composition of a movement control unit in the video game device of FIG. 1.

FIG. 2 shows the functional composition of a movement control unit in the video game device of FIG. 1. The processing of the movement control unit is essentially realized by the central processing unit (CPU) 2 and the memory 3 in FIG. 1. And the functions of the movement control unit may be realized by means of a computer-readable program. When executed by a computer, the computer-readable program causes the computer to perform the processing of the movement control unit of the video game device in one embodiment of the invention.

As shown in FIG. 2, the movement control unit 100 comprises the following units 110, 120 and 130.

The input-item display unit 110 displays the input items which can be inputted (or selected) as the move command by the player, on the video monitor, based on the branch data D1, the movement data D2, and the free-movement-area data D3.

The move-command processing unit 120 receives the move command inputted by the player, from the input unit 1, and processes the movement of the game character etc. in accordance with the received move command.

The state control unit 130 performs switching from one of a standby state, a normal movement state, and a free movement state to another, and determines whether the destination of the received move command is reached or not.

The input-item display unit 110 comprises the following units 111 to 115.

The branch-direction-arrow display unit 111 displays the branch direction arrows which can be selected by the player at a branch point on a path.

The preceding-branch-direction-arrow display unit 112 displays the preceding branch direction arrows which can be selected at the branch point (preceding branch point) which exists previously when a branch direction arrow is selected by the player.

The forward/backward arrow display unit 113 displays the forward/backward direction arrows which indicate the directions of forward/backward movement of the game character or unit (or the group of game characters).

The stop-mark display unit 114 displays the stop mark which is provided to suspend movement of the game character or unit.

The free-movement-area display unit 115 displays the free-movement area where the direction of free movement can be inputted by the player if the free movement of the game character or unit is permitted at a place where the path is broad.

The move-command processing unit 120 comprises the following units 121 to 126.

The move-command input unit 121 inputs or receives the move command inputted by the user on the input unit 1 which is provided with any of the touch panel, the buttons, and the joystick.

The branch-select processing unit 122 performs a predetermined processing when the received move command indicates branch selection.

The preceding-branch-select processing unit 123 performs a predetermined processing when the received move command indicates preceding branch selection.

The forward/backward select processing unit 124 performs a predetermined processing when the received move command indicates forward/backward selection.

The stop-select processing unit 125 performs a predetermined processing when the received move command indicates stop selection (including stop cancellation selection).

The free-movement input processing unit 126 performs a predetermined processing when the received move command indicates free movement input.

Figure 3:
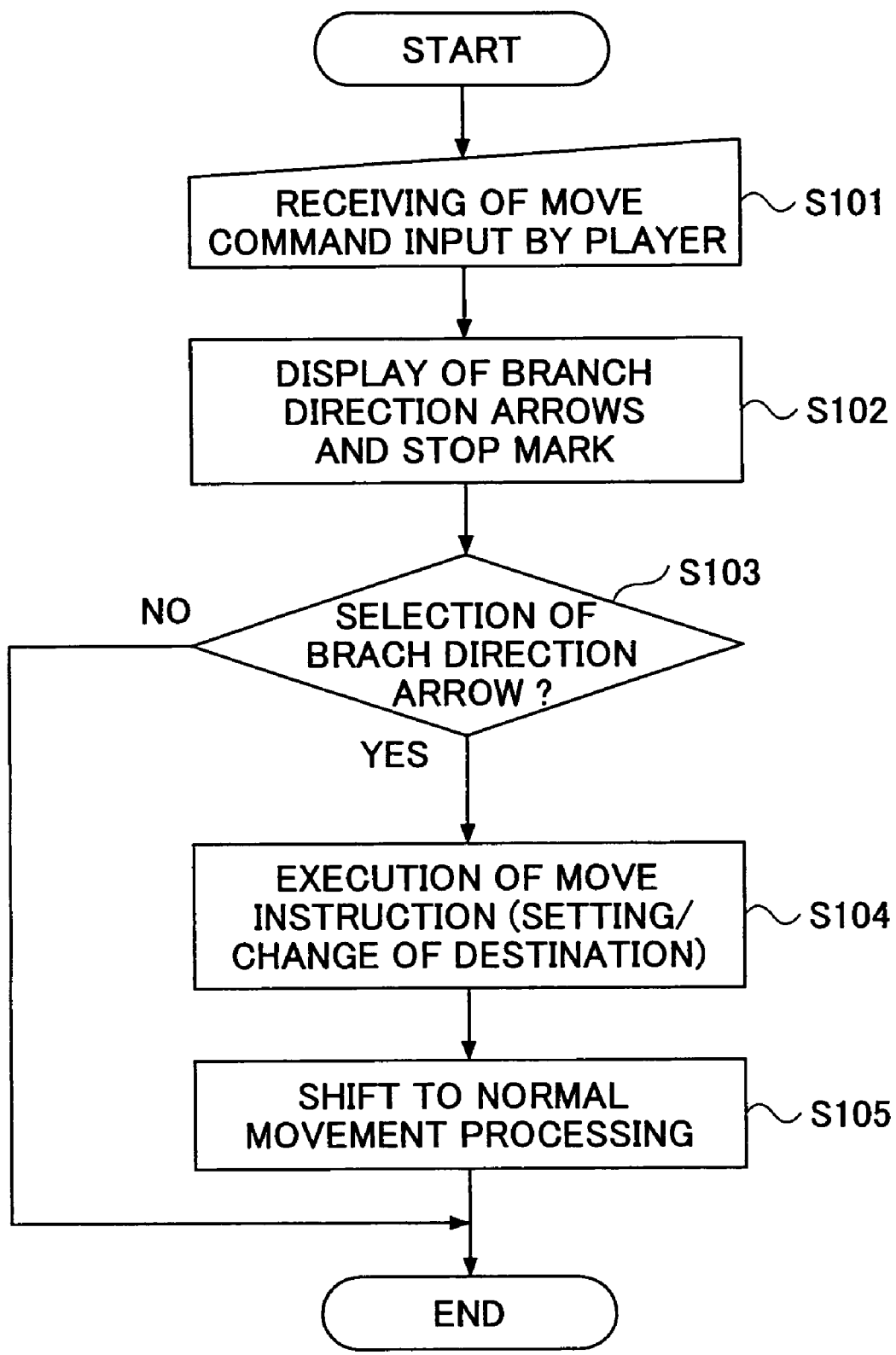
FIG. 3 is a flowchart for explaining the processing of the movement control unit in a standby state.

Next, FIG. 3 is a flowchart for explaining the processing of the movement control unit in the standby state.

The processing of FIG. 3 is repeatedly performed on the basis of one or several frames of the display screen outputted to the display unit. As previously described, the processing of the movement control unit shown in FIG. 3 is essentially realized by the central processing unit (CPU) 2 and the memory 3 in FIG. 1.

Suppose that, in FIG. 3, the movement control unit is set in the standby state, and the game character is at a branch point on a path.

The CPU 2 receives a move command inputted by the player on the input unit 1 provided with any of the touch panel, the buttons and the joystick (step S101).

The CPU 2 displays the branch direction arrows and the stop mark on the video monitor (step S102).

The CPU 2 determines whether the move command from the player indicates selection of a branch direction arrow (step S103).

When the move command indicates selection of a branch direction arrow, the CPU 2 executes the move instruction (step S104). At the same time, the CPU 2 sets up a branch point which is the first occurrence on the following path toward the selected branch direction, as the next destination.

The CPU 2 at step S105 shifts to the processing (FIG. 5) of the normal movement state after execution of the move instruction.

If the CPU 2 shifts to the processing of the normal movement state from the processing of FIG. 3, the processing of FIG. 3 is terminated. Otherwise the processing of FIG. 3 is repeated.

Figure 4:
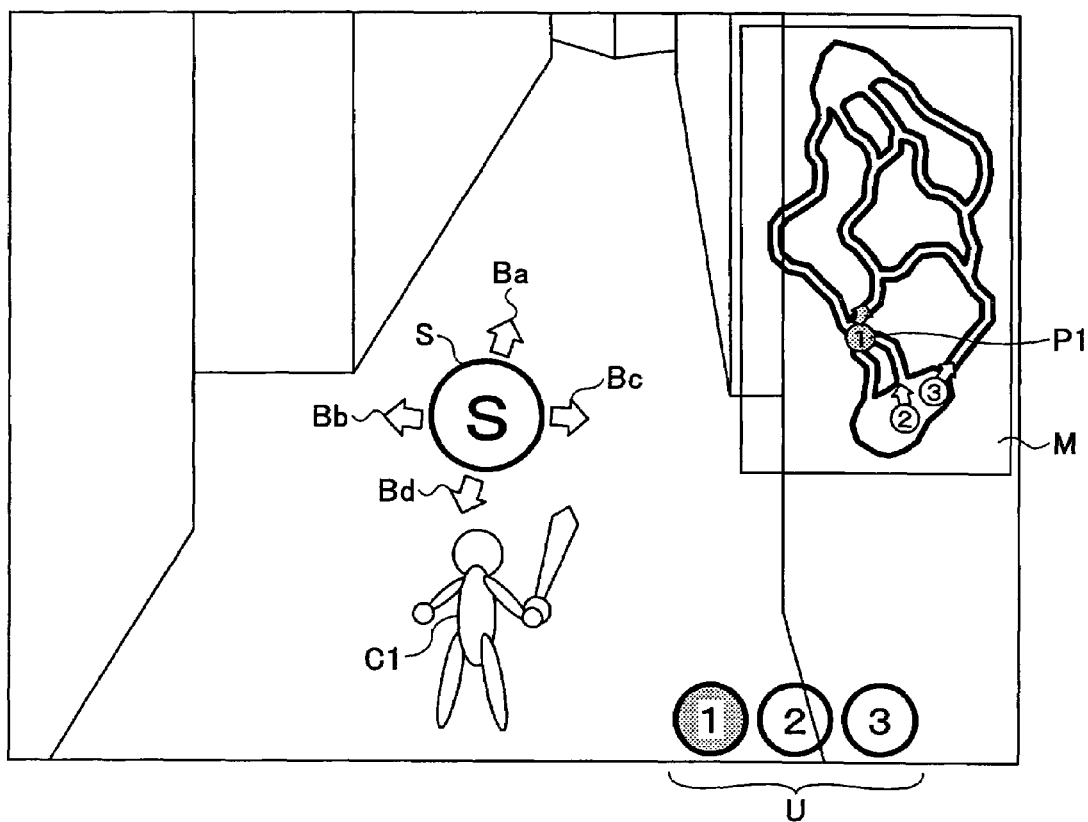
FIG. 4 is a diagram showing an example of a display screen in the standby state.

FIG. 4 shows an example of the display screen in the above-mentioned standby state. As shown in FIG. 4, the game character C1 stops at the position P1 on the map screen M.

The stop mark S which accepts receiving of a stop instruction (at this time, the stop mark S is deactivated because of the stop condition), and the branch direction arrows Ba-Bd on the circumference of the stop mark, which indicate the path directions which can be selected by the player, are displayed almost in the middle of the display screen.

In addition, the unit selection marks U are provided to enable the player to choose the unit which the game character belongs to, and "1", "2", and "3" correspond to the numbers displayed on the map screen M respectively. In this example, it is supposed that the game character C1 belongs to the unit represented by the "1".

If the player in this condition selects one of the branch direction arrows Ba-Bc, then the CPU 2 shifts to the processing of the normal movement state. The selection by the player in this case is performed by touching the display screen when the input unit is provided with the touch panel, or by clicking it with the mouse when the input unit is provided with the mouse.

Figure 5:
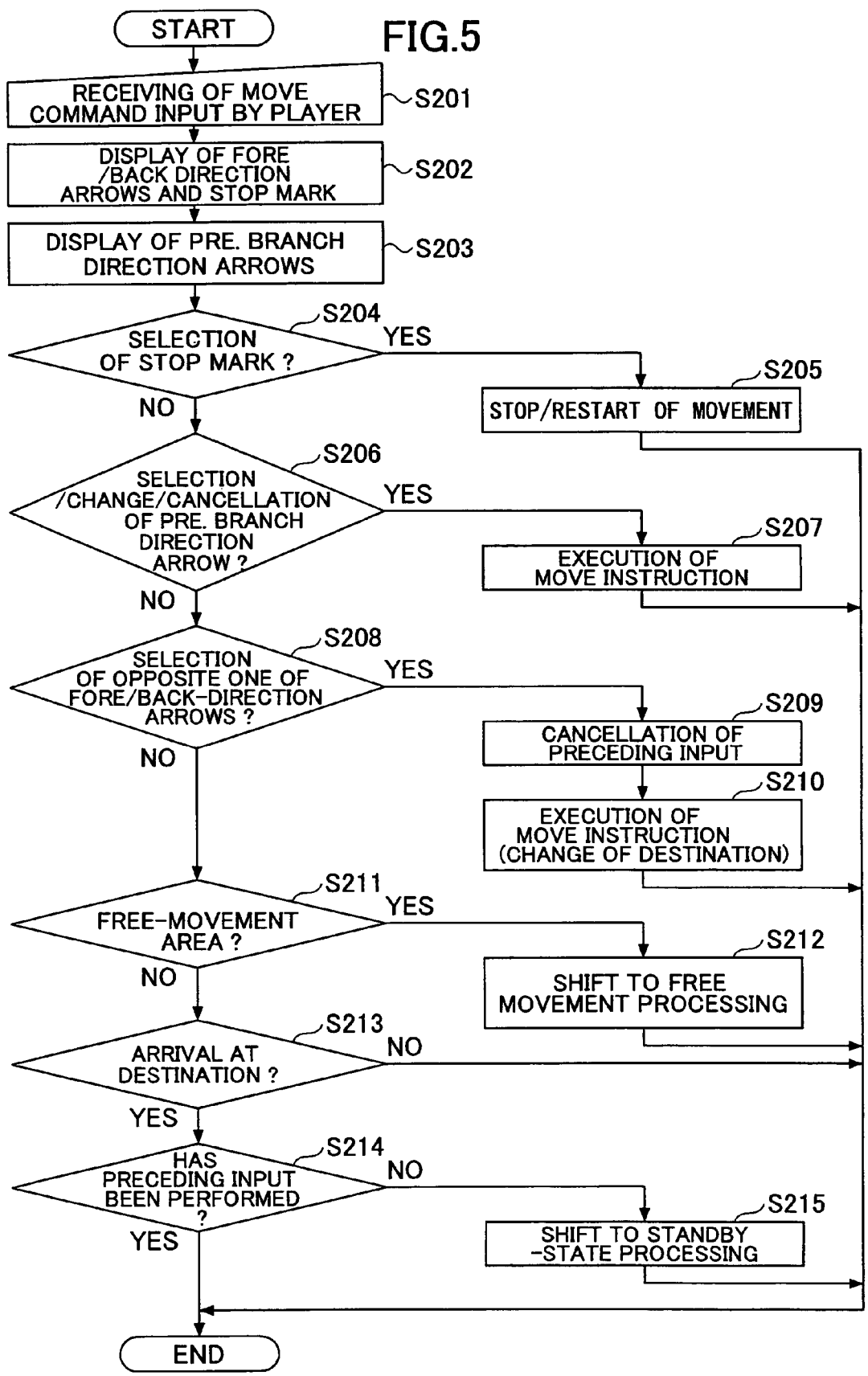
FIG. 5 is a flowchart for explaining the processing of the movement control unit in a normal movement state.

FIG. 5 is a flowchart for explaining the processing of the movement control unit in the normal movement state. The processing of FIG. 5 is repeatedly performed on the basis of one or several frames of the display screen outputted to the display unit, similar to the processing shown in FIG. 3.

As shown in FIG. 5, the CPU 2 at step S201 receives a move command inputted by the player on the input unit 1 provided with any of the touch panel, the buttons, and the joystick, as processing of the normal movement state.

The CPU 2 at step S202 displays the forward/backward direction arrows and the stop mark on the video monitor. The CPU 2 at step S203 displays the preceding branch direction arrows on the video monitor.

Figure 6:
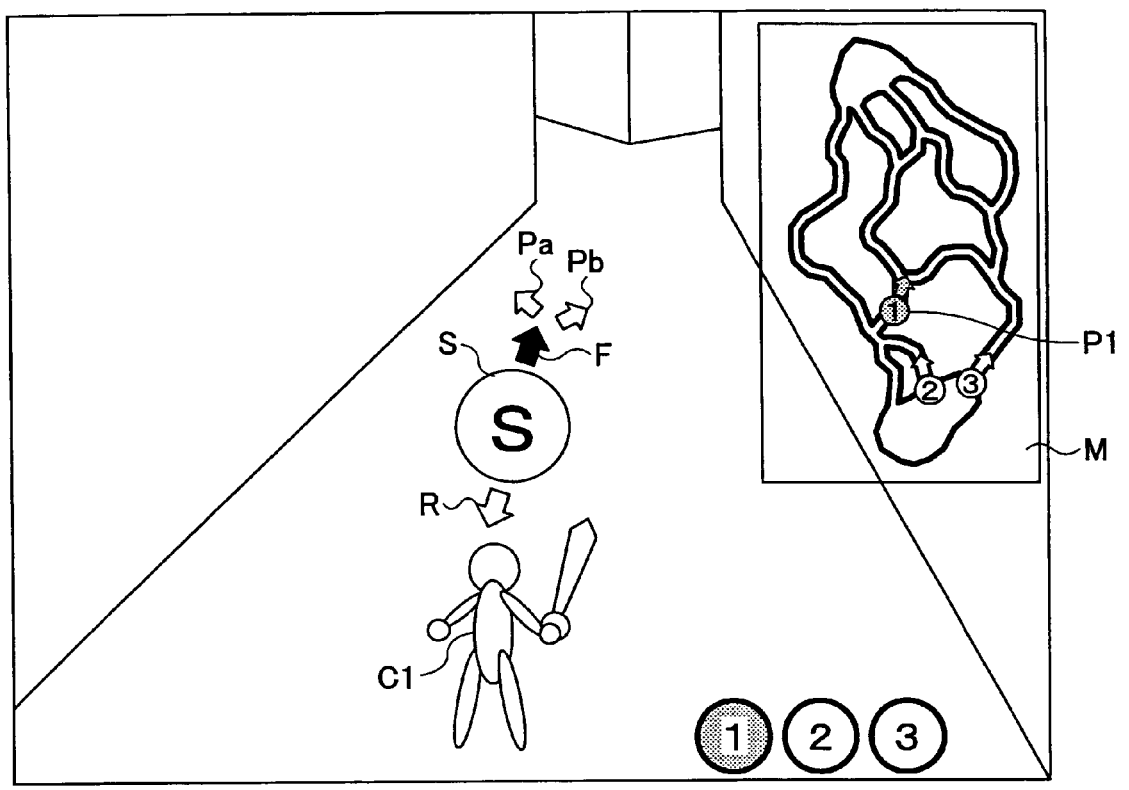
FIG. 6 is a diagram showing an example of a display screen in the state in which the forward/backward direction arrows, the stop mark, and the preceding branch direction arrows are displayed in the normal movement state.

FIG. 6 shows an example of the display screen in the state in which the forward/backward direction arrows, the stop mark, and the preceding branch direction arrow are displayed in the normal movement state. Suppose that, in FIG. 6, the game character C1 is at the position P1 and moves on the map screen M.

As shown in FIG. 6, the stop mark S which accepts receiving of a stop instruction is displayed ahead of the game character C1. The forward direction arrow F, indicated in the highlight state, which accepts turning of the game character C1 to that forward direction, and the backward direction arrow R which accepts turning of the game character C to the opposite direction are also displayed on the circumference of the stop mark S. Moreover, the preceding branch direction arrows Pa and Pb which indicate the path directions at the next branch point that are selectable by the player are displayed ahead of the forward direction arrow F.

Referring back to FIG. 5, the CPU 2 at step S204 determines whether the move command inputted by the player indicates selection of the stop mark as processing of the normal movement state.

When the stop mark is selected during movement, the CPU 2 at step S205 stops the movement. When the stop mark is selected during a stop, the CPU 2 at step S205 restarts the movement.

Figure 7:
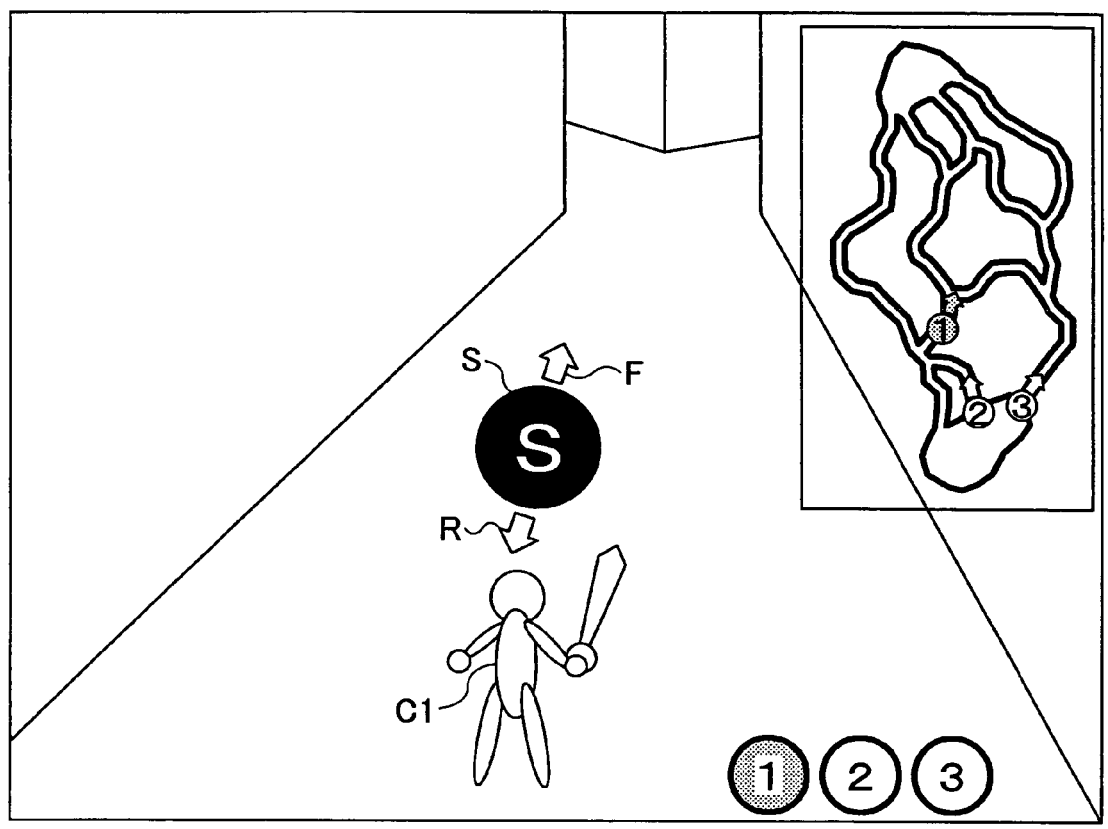
FIG. 7 is a diagram showing an example of a display screen in the state in which the stop mark is selected in the normal movement state.

FIG. 7 shows an example of the display screen in the state in which the stop mark is selected in the normal movement state. Selecting the stop mark S by the player causes the stop mark S to be highlighted, and the movement of the game character C1 is stopped. The selection by the player is performed by touching the display screen when the input unit is provided with the touch panel, or by clicking it with the mouse when the input unit is provided with the mouse.

During movement, the forward direction arrow F which was highlighted is returned to the normal display indication, and the display indications of the preceding branch direction arrows are eliminated. If the stop mark S in the state shown in FIG. 7 is again selected by the player, then the display indication is returned to the movement state shown in FIG. 6.

Referring back to FIG. 5, the CPU 2 determines whether the move command from the player indicates selection, change or cancellation of a preceding branch direction arrow as processing of the normal movement state (step S206). When the move command indicates selection, change or cancellation of a preceding branch direction arrow, the CPU 2 at step S207 executes the move instruction.

Figure 8:
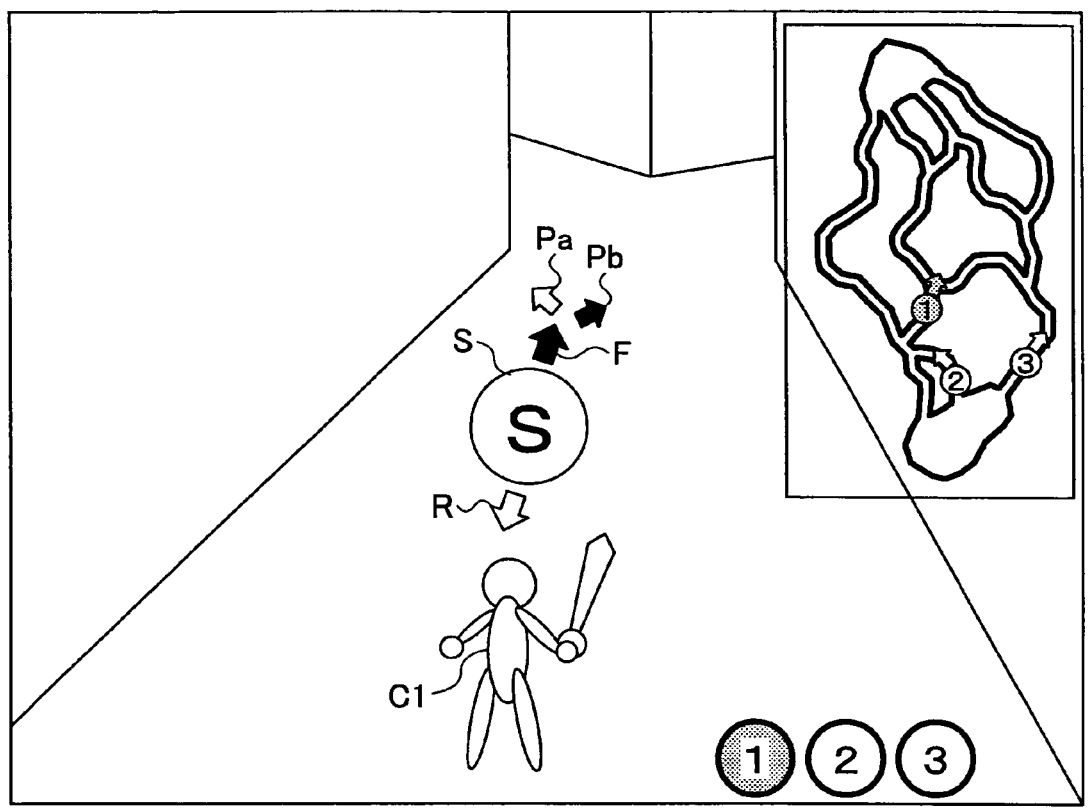
FIG. 8 is a diagram showing an example of a display screen in the state in which the preceding branch direction arrow is selected in the normal movement state.

FIG. 8 shows an example of the display screen in the state in which the preceding branch direction arrow is selected in the normal movement state. In the state shown in FIG. 8, the preceding branch direction arrow Pb is selected by the player and it is highlighted.

Figure 9:
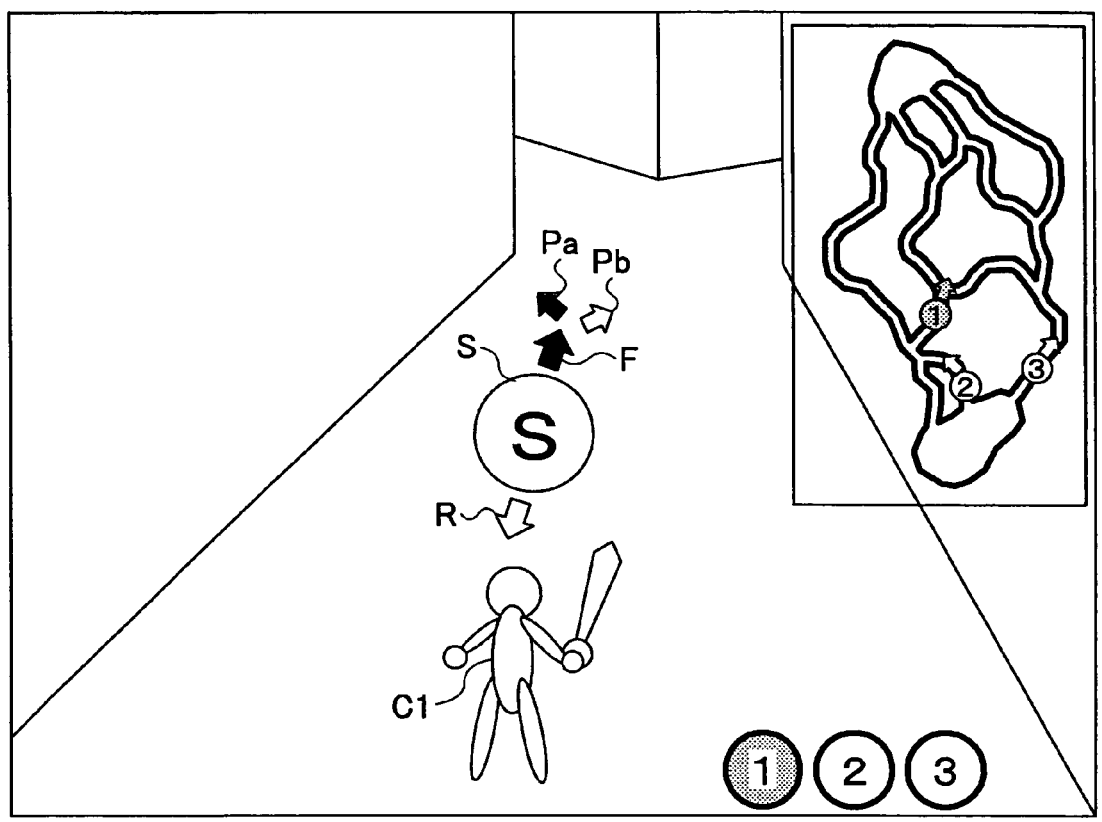
FIG. 9 is a diagram showing an example of a display screen in the state in which selection of the preceding branch direction arrow is changed in the normal movement state.

FIG. 9 shows an example of the display screen in the state in which selection of the preceding branch direction arrow is changed in the normal movement state. In the state shown in FIG. 9, the preceding branch direction arrow Pa is selected by the player. The previously selected preceding branch direction arrow Pb which was highlighted is returned to the normal display indication, while the newly selected preceding branch direction arrow Pa is highlighted.

Figure 10:
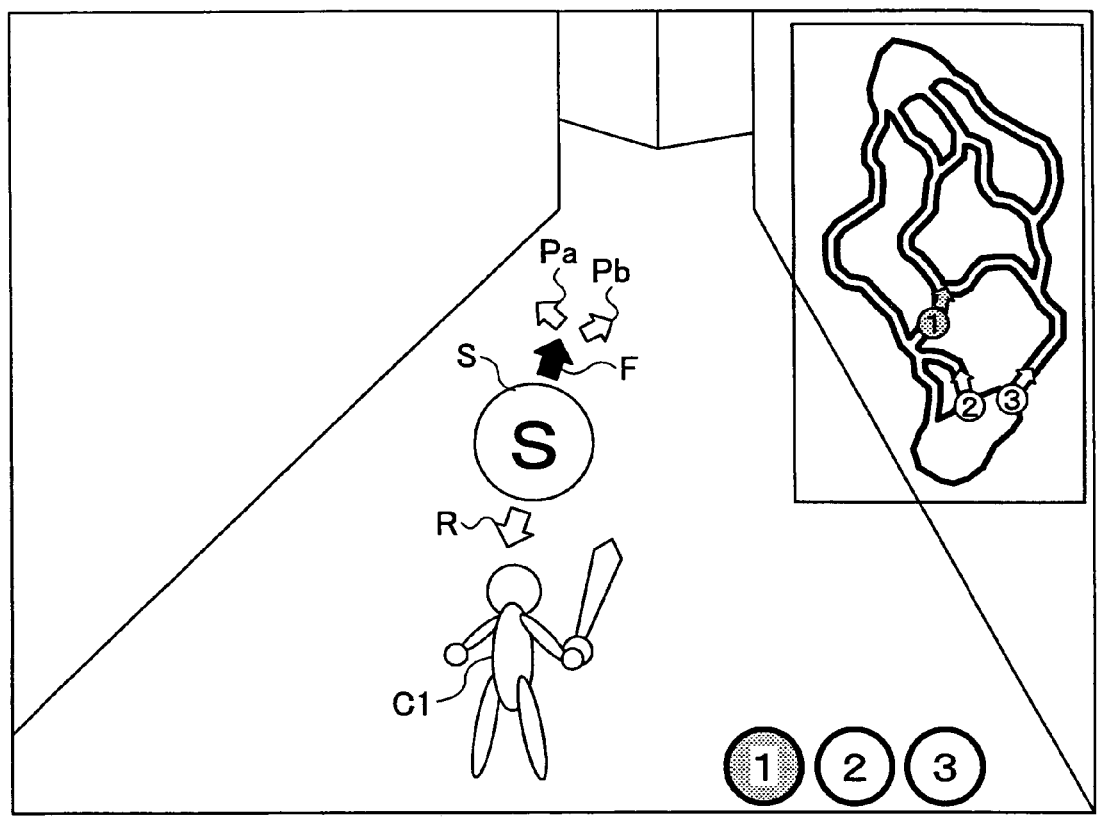
FIG. 10 is a diagram showing an example of a display screen in the state in which selection of the preceding branch direction arrow is canceled in the normal movement state.

FIG. 10 shows an example of the display screen in the state in which selection of the preceding branch direction arrow is canceled in the normal movement state. In the state shown in FIG. 10, the previously selected preceding branch direction arrow Pa which was highlighted is selected again by the player, and it is returned to the normal display indication.

Referring back to FIG. 5, the CPU 2 at step S208 determines whether the move command from the player indicates selection of the opposite one of the forward/backward direction arrows to the current movement direction as processing of the normal movement state.

When the move command indicates selection of the opposite one of the forward/backward direction arrows to the current movement direction, the CPU 2 at step S209 cancels the preceding input which was made by the preceding branch direction arrow. The CPU 2 at step S210 executes the move instruction accompanied with the change of the destination.

Figure 11:
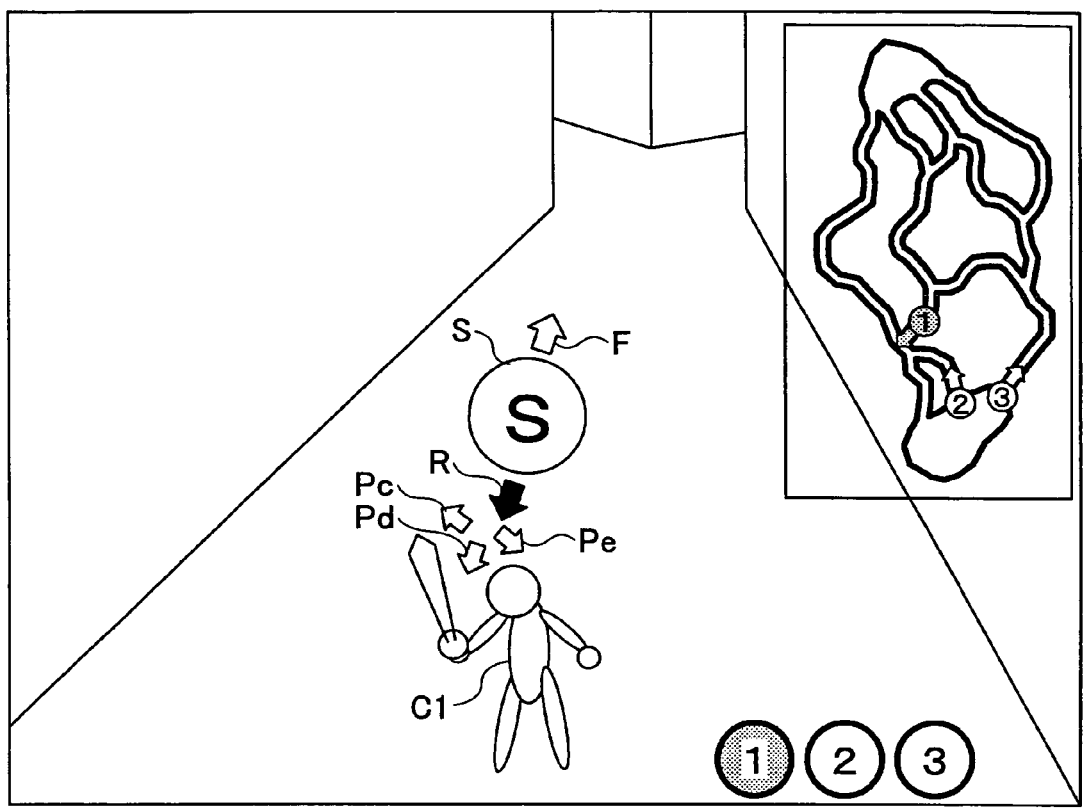
FIG. 11 is a diagram showing an example of a display screen in the state in which the backward direction arrow is selected in the normal movement state.

FIG. 11 shows an example of the display screen in the state in which the backward direction arrow is selected in the normal movement state.

Although the game character C1 was moving in the direction of the forward direction arrow F, the backward direction arrow R is selected, and the preceding branch direction arrows, which were displayed ahead of the forward direction arrow F, are now canceled and eliminated. At the same time, the backward direction arrow R is newly highlighted, and the preceding branch direction arrows Pc, Pd and Pe, which indicate the path directions at the next branch point that are selectable by the player, are displayed ahead of the backward direction arrow R. In this state, the branch point which will appear for the first time on the path in the direction indicated by the backward direction arrow R is set to the next destination.

When any of the preceding branch direction arrows Pc, Pd and Pe is selected in this state, the corresponding operation is carried out by the CPU 2 which performs the judgment processing of step S206 as to the selection of the preceding branch direction arrow, and performs the processing of step S207 which executes the move instruction.

Referring back to FIG. 5, the CPU 2 at step S211 determines whether the current position of the game character or the unit enters the free-movement area (where the game character can move freely) as processing of the normal movement state. When the current position of the game character enters the free-movement area, the CPU 2 at step S212 shifts to the processing (FIG. 16) of free movement state.

The processing of the free movement state will be explained later. When the CPU 2 shifts to the processing of the free movement state, the processing of FIG. 5 is terminated. Otherwise the processing of FIG. 5 is repeated as described above.

Subsequently, the CPU 2 at step S213 determines whether the current position of the game character or unit reaches the destination as processing of the normal movement state. When the game character reaches the destination, the CPU 2 at step S214 determines whether the preceding input has been performed by any preceding branch direction arrow. When the preceding input has been performed, the CPU 2 at step S215 shifts to the processing (FIG. 3) of the standby state. When the CPU 2 shifts to the processing of the standby state from the processing of FIG. 5, the processing of FIG. 5 is terminated. Otherwise the processing of FIG. 5 is repeated.

Figure 12:
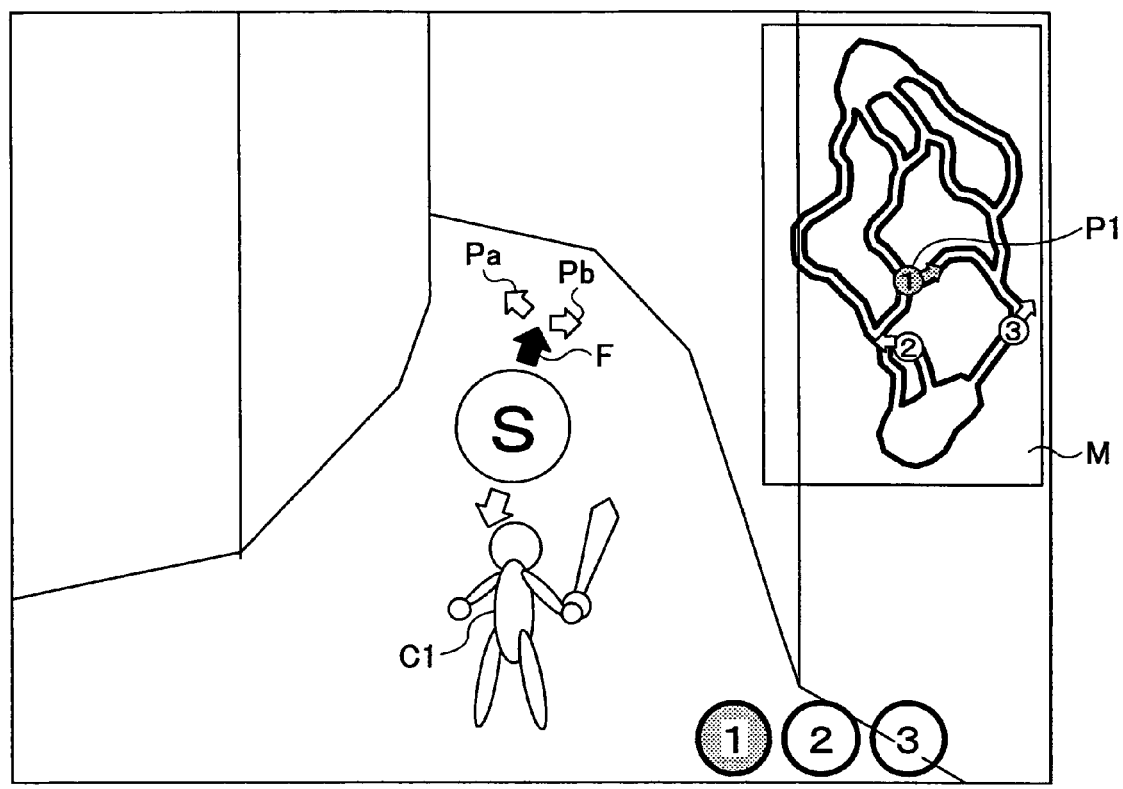
FIG. 12 is a diagram showing an example of a display screen in the state in which new preceding branch direction arrows are displayed after the destination arrival in the normal movement state.

FIG. 12 shows an example of the display screen in the state in which new preceding branch direction arrows are displayed after the destination arrival in the normal movement state progressing from the state of FIG. 8. Suppose that the game character C1 is at the position P1 on the map screen M. Even if the game character C1 arrives at the destination, the game character C1 continues to move in the direction of the highlighted forward direction arrow F according to the preceding input performed by the preceding branch direction arrow. And the preceding branch direction arrows Pa and Pb, which indicate the path directions at the next branch point that are selectable by the player, are displayed ahead of the forward direction arrow F.

Figure 13:
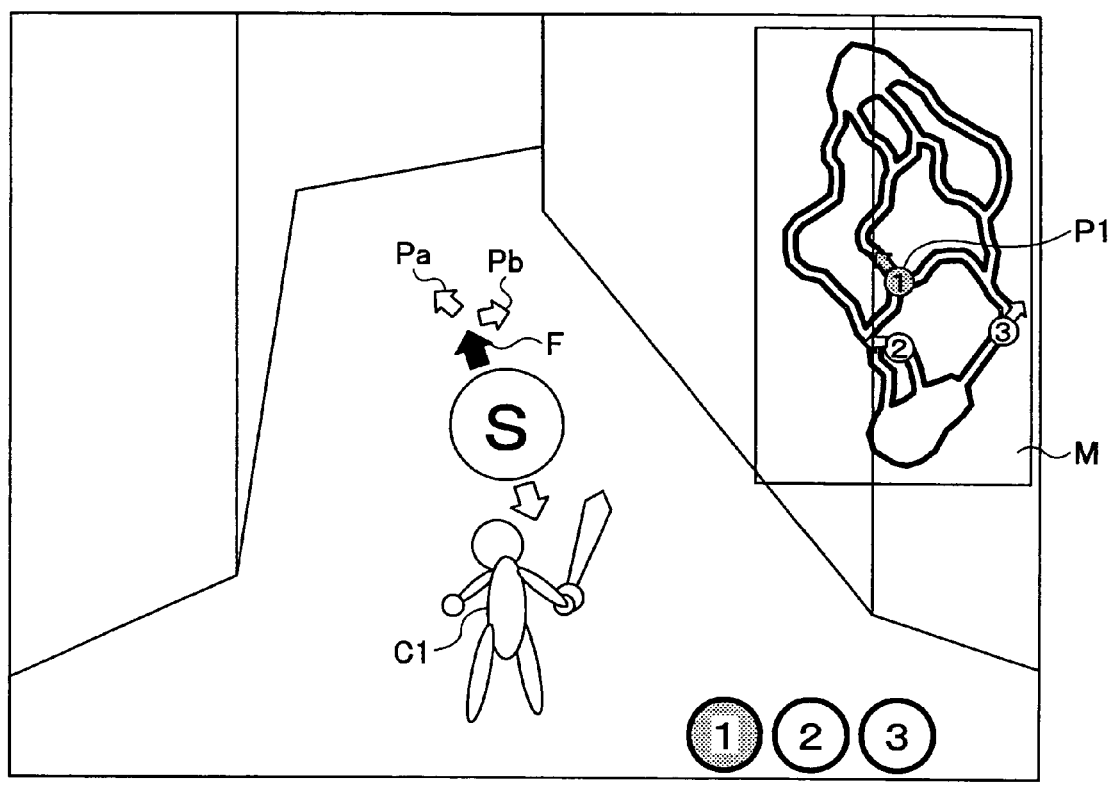
FIG. 13 is a diagram showing an example of a display screen in the state in which new preceding branch direction arrows are displayed after the destination arrival in the normal movement state.

FIG. 13 shows another example of the display screen in the state in which new preceding branch direction arrows are displayed after the destination arrival in the normal movement state progressing from the state of FIG. 9. Suppose that the game character C1 in this case is moving in the other direction according to the preceding input, from the position P1 on the map screen M.

Also in this case, even if the game character C1 arrives at the destination, the game character C1 continues to move in the direction of the highlighted forward direction arrow F according to the preceding input performed by the preceding branch direction arrow. And the preceding branch direction arrows Pa and Pb which indicate the path directions at the next branch point that are selectable by the player are displayed ahead of the forward direction arrow F.

When either of the preceding branch direction arrows Pa and Pb is selected in this state, the corresponding operation is carried out by the CPU 2 which performs the judgment processing of step S206 as to the selection of the preceding branch direction arrow, and performs the processing of step S207 which executes the move instruction.

Figure 14:
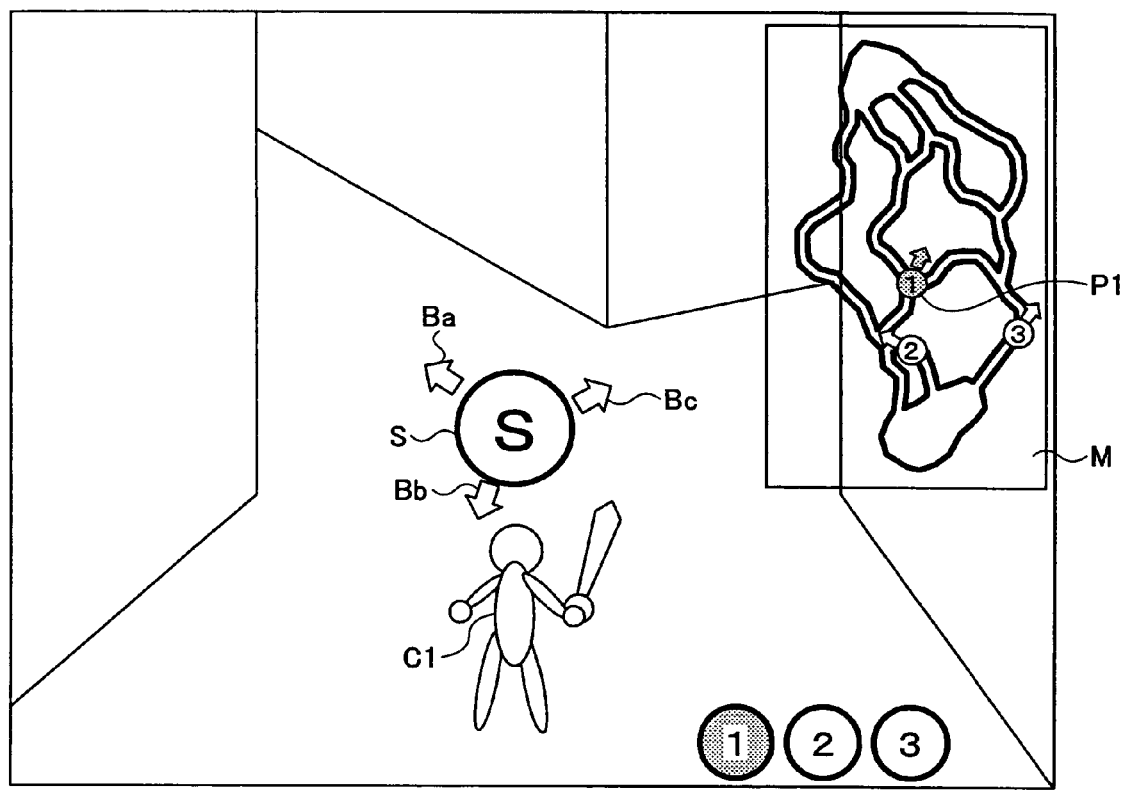
FIG. 14 is a diagram showing an example of a display screen in a stop state following destination arrival when any preceding input is not performed in the normal movement state.

FIG. 14 shows an example of the display screen in the stop state following the destination arrival when any preceding input is not performed in the normal movement state progressing from the state of FIG. 10. Suppose that the game character C1 is at the position P1 on the map screen M. Since any preceding input for selecting the next movement direction is not performed by the player, the movement of the game character C1 is stopped, and the CPU 2 shifts to the processing (FIG. 3) of the standby state. And the stop mark S, and the branch direction arrows Ba-Bc on the circumference of the stop mark S which indicate the path directions that are selectable by the player are displayed. However, at this time, the stop mark S is deactivated because of the stop condition.

Figure 15:
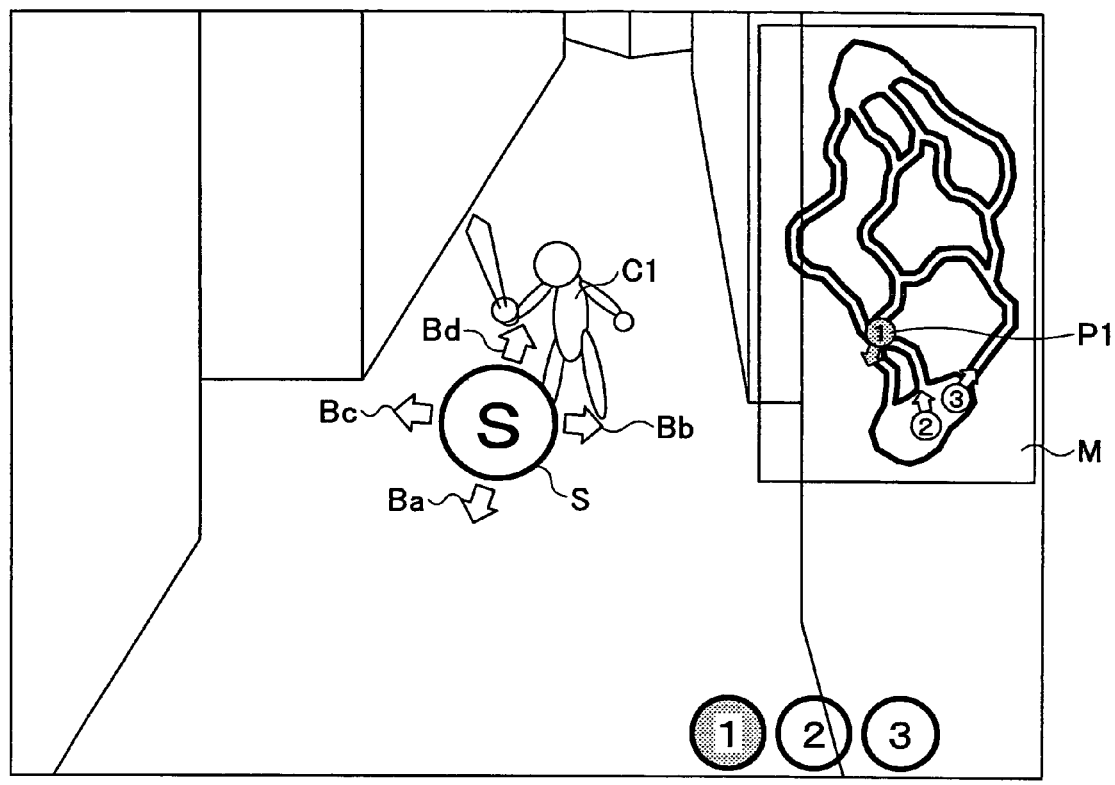
FIG. 15 is a diagram showing an example of the display screen in the stop state following the destination arrival when any preceding input is not performed in the normal movement state.

FIG. 15 shows an example of the display screen in the stop state following the destination arrival when any preceding input is not performed in the normal movement state progressing from the state of FIG. 11. Suppose that the game character C1 is at the position P1 on the map screen M. Since any preceding input for selecting the next movement direction is not performed by the player, the movement of the game character C1 is stopped, and the CPU 2 shifts to the processing (FIG. 3) of the standby state. And the stop mark S, and the branch direction arrows Ba-Bd on the circumference of the stop mark S which indicate the path directions that are selectable by the player are displayed. However, at this time, the stop mark S is deactivated because of the stop condition.

When any of the branch direction arrows Ba-Bd is selected in this state, the corresponding operation is carried out by the CPU 2 which performs the processing of FIG. 3.

Figure 16:
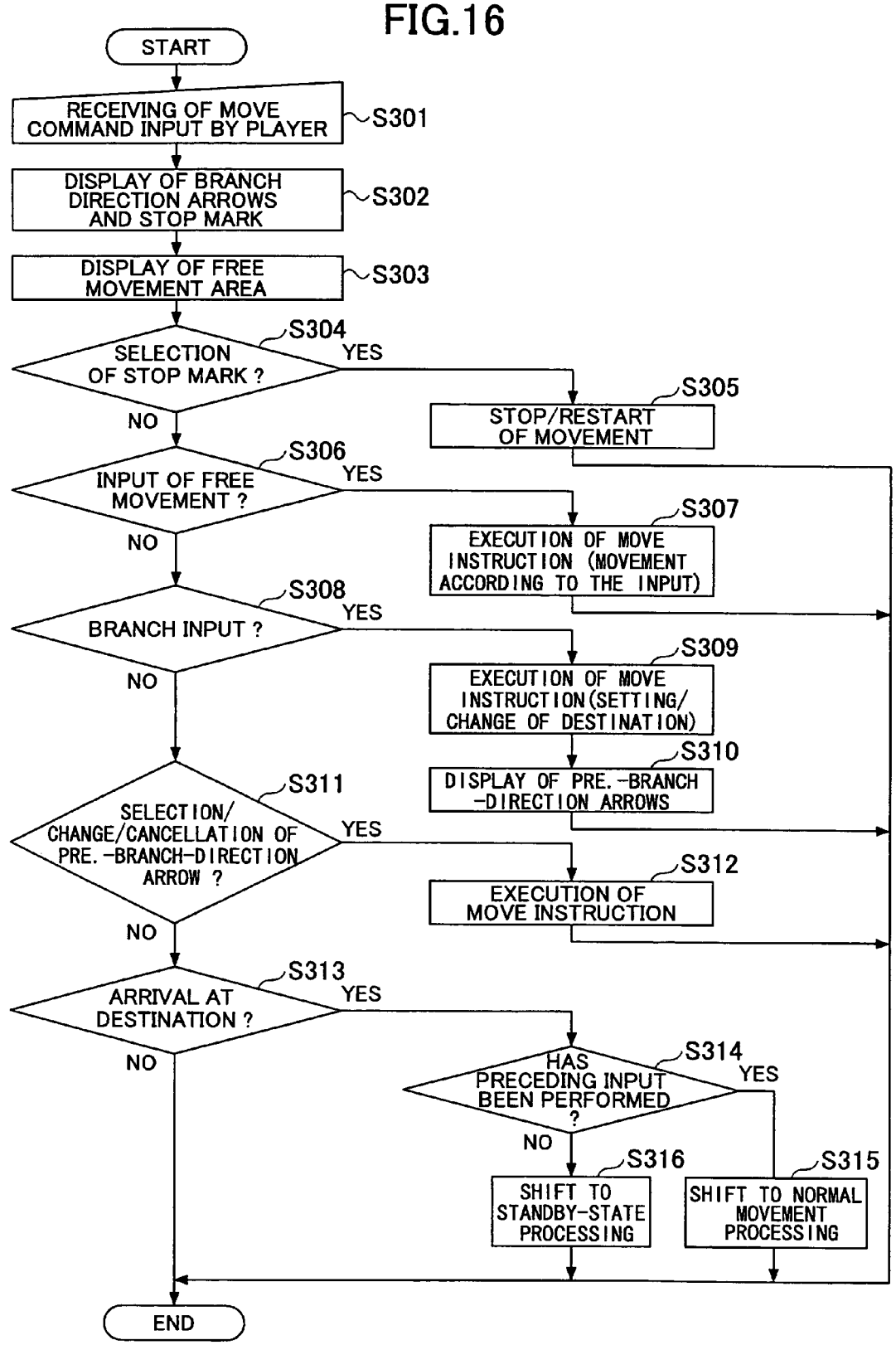
FIG. 16 is a flowchart for explaining the processing of the movement control unit in a free movement state.

FIG. 16 is a flowchart for explaining the processing of the movement control unit in a free movement state.

The processing of FIG. 16 is repeatedly performed on the basis of one or several frames of the display screen outputted to the display unit, similar to the processing shown in FIG. 3 or FIG. 5.

As shown in FIG. 16, the CPU 2 at step S301 receives a move command inputted by the player on the input unit 1 provided with any of the touch panel, the buttons, and the joystick, as processing of the normal movement state.

The CPU 2 at step S302 displays the branch direction arrows and the stop mark on the video monitor. The CPU 2 at step S303 displays the free-movement area FR on the video monitor.

Figure 17:
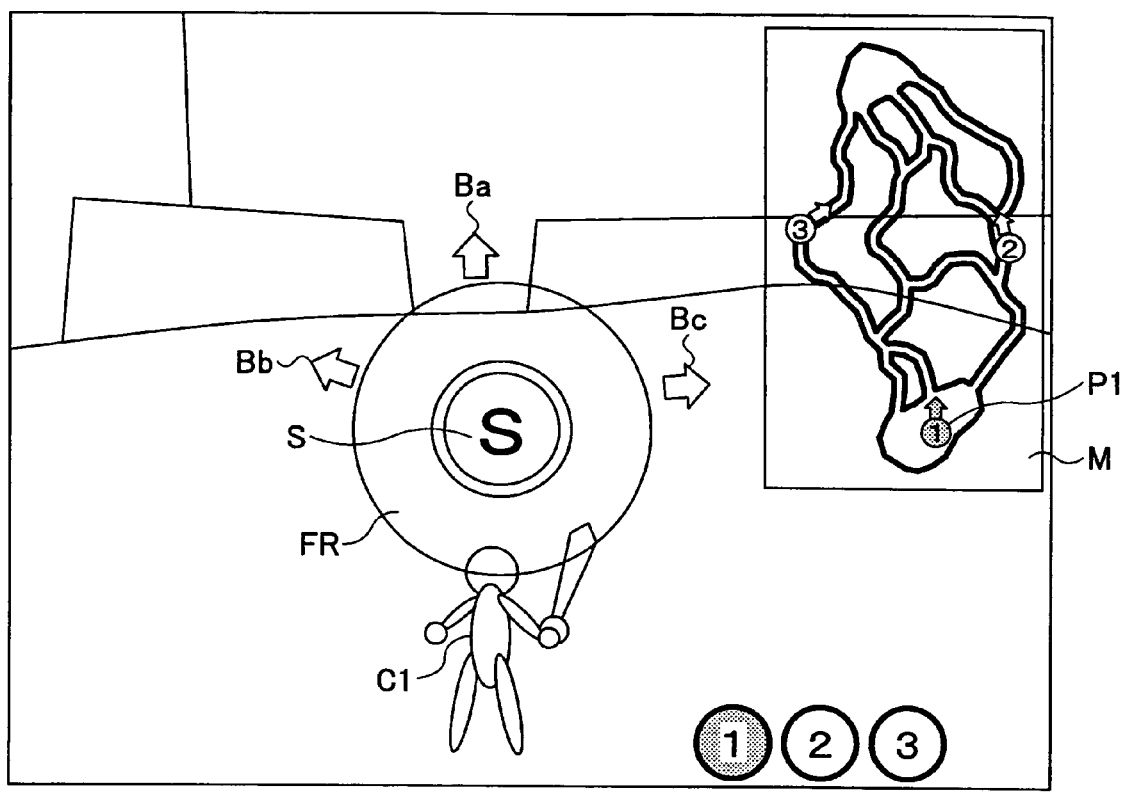
FIG. 17 is a diagram showing an example of a display screen in the state in which the branch direction arrows, the stop mark, and the free-movement area are displayed in the free movement state.

FIG. 17 shows an example of the display screen in the state in which the branch direction arrows, the stop mark, and the free-movement area are displayed in the free movement state.

The free-movement state takes place at the position that is comparatively broad like the position P1 on the map screen M shown in FIG. 17. The stop mark S which accepts receiving of a stop instruction, and the free-movement area FR where a free movement in any direction on the circumference of the stop mark is permitted, are displayed almost in the middle of the display screen of FIG. 17. In the example of FIG. 17, a free movement in any direction is permitted, and the circular area is shown as the free-movement area FR. The free-movement area FR may sometimes be in the shape of one or a plurality of sectors. And the branch direction arrows Ba-Bc, which indicate the path directions in the free-movement area FR that are arbitrarily selectable by the player, are displayed on the circumference of the free-movement area FR.

Referring back to FIG. 16, the CPU 2 at step S304 determines whether the move command from the player indicates selection of the stop mark as processing of the free movement state.

When the stop mark is selected during movement, the CPU 2 at step S305 stops the movement of the game character. When the stop mark is selected during a stop, the CPU at step S305 restarts the movement of the game character.

Subsequently, the CPU 2 at step S306 determines whether the move command from the player is a free movement input as processing of the free movement state. When the move command is a free movement input, the CPU 2 at step S307 executes the move instruction, so that the game character moves in the direction according to the inputted direction.

Figure 18:
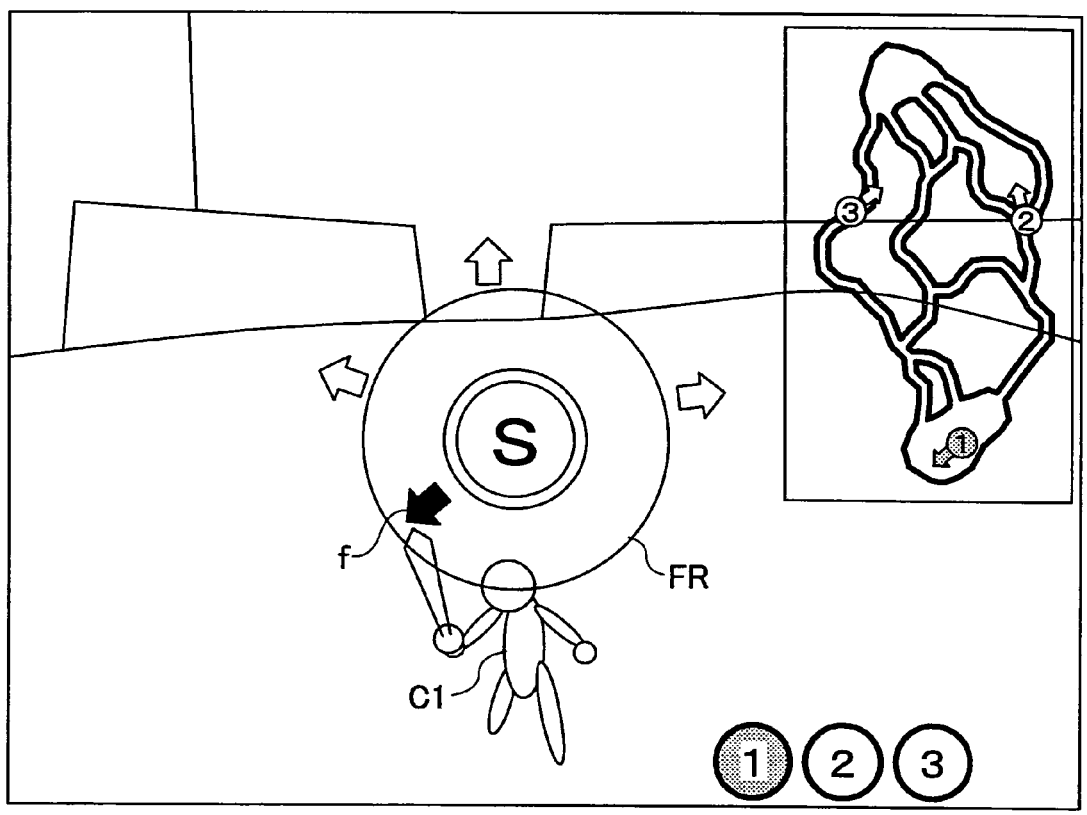
FIG. 18 is a diagram showing an example of a display screen in the state in which a free movement input is performed in the free movement state.

FIG. 18 shows an example of the display screen in the state in which the free movement input is performed in the free movement state. As shown in FIG. 18, the free-movement direction arrow f within the free-movement area FR, corresponding to the portion inputted by the player, is highlighted, and the game character C1 moves in the direction indicated by the free-movement direction arrow f.

The free-movement area may be changed as a result of the movement. Displaying of the changed free-movement area FR in that case is performed by the CPU 2 which performs the above processing of step S303 to display the free-movement area.

Figure 19:
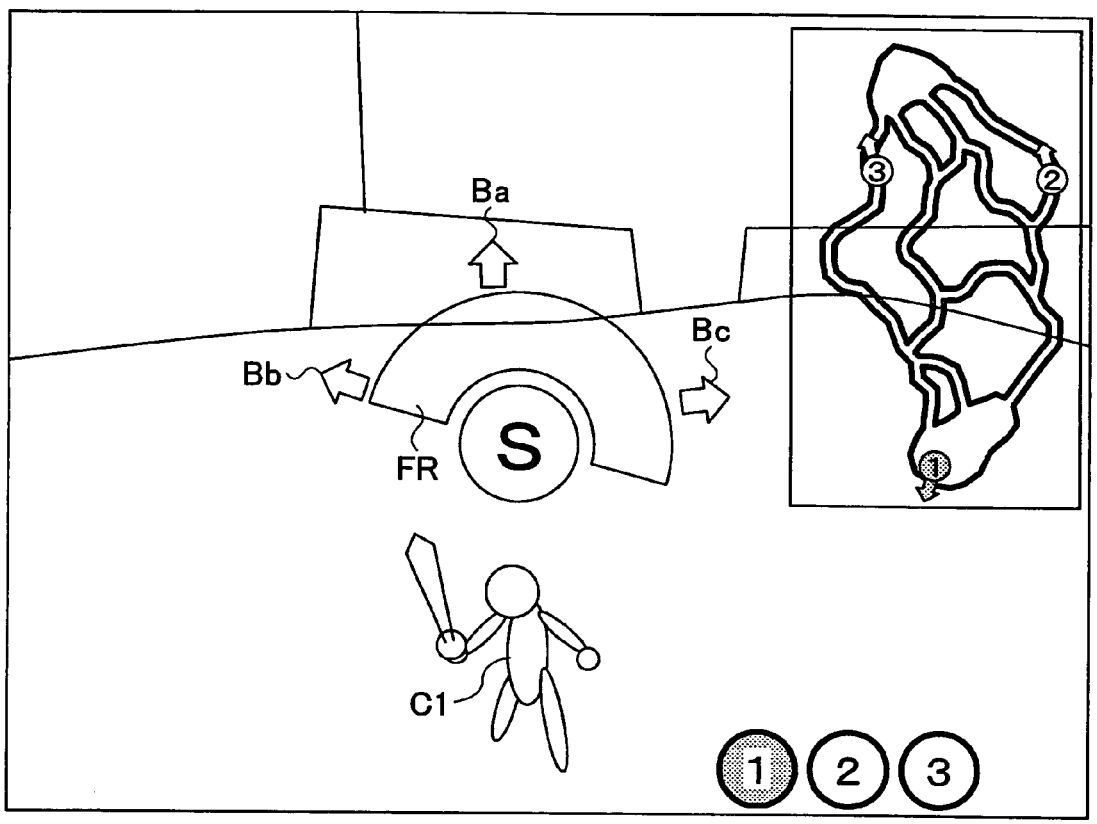
FIG. 19 is a diagram showing an example of a display screen in the state in which the boundary where further forward movement is inhibited is reached in the free movement state.

FIG. 19 shows an example of the display screen in the state in which the boundary where further forward movement is inhibited is reached in the free movement state. In the state of FIG. 19, the movement of the game character C1 is stopped, and a new free-movement area FR and new branch direction arrows Ba-Bc are displayed.

Referring back to FIG. 16, the CPU 2 at step S308 determines whether the move command from the player is a branch input as processing of the free movement state. When the move command is a branch input, the CPU 2 at step S309 executes the move instruction including setting or change of the destination. And the CPU 2 at step S310 displays the preceding branch direction arrows.

Subsequently, the CPU 2 at step S311 determines whether the move command from the player indicates selection, change, or cancellation of a preceding branch direction arrow. When the move command indicates selection, change, or cancellation of a preceding branch direction arrow, the CPU 2 at step S312 executes the move instruction.

Subsequently, the CPU 2 at step S313 determines whether the current position of the game character or unit reaches the destination. When the destination is reached, the CPU 2 at step S314 determines whether the preceding input has been performed by any preceding branch direction arrow. When the preceding input has been performed, the CPU 2 at step S315 shifts to the processing (FIG. 5) of the normal movement state. On the other hand, when the preceding input has not been performed, the CPU 2 at step S316 shifts to the processing (FIG. 3) of the standby state.

When the CPU 2 shifts from the processing of FIG. 16 to either the processing of the normal movement state or the processing of the standby state, the processing of FIG. 16 is terminated. Otherwise the processing of FIG. 16 is repeated.

In the above-described embodiment, the preceding branch direction arrows are provided as the preceding input for selecting a one-step following branch direction on a following path. However, the present invention is not limited to a particular number of stages for selection of branch directions as the preceding input. It is possible that the preceding branch direction arrows are provided as the preceding input for selecting an arbitrary multiple-step following branch direction on a following path.

As described in the foregoing, according to the present invention, a move instruction for selecting a following branch direction on a following path can be inputted beforehand by performing the preceding input with the easily inputted operation. When compared with the conventional method in which the input operation of the buttons or the like must be continued until the final destination is reached, the present invention does not require any complicated input operation of the buttons or the like. According to the present invention, the input operation of the buttons or the like does not become a serious burden for the player even when performing a video game having a long movement path.

Moreover, when compared with the conventional method in which the next destination is specified on the visual field image or the map image, the present invention does not require the frequently specifying operation of the next destination even when many branch points appear on the movement path. According to the present invention, the input operation by the player becomes very easy.

Moreover, according to the present invention, the preceding input for selecting a following movement path can be performed so as to meet the player's intension. And the player is allowed to freely change or cancel selection of the following movement path. The present invention has no problem that the system automatically sets up an intermediate movement path according to the shortest path method as in the conventional method, and the player can enjoy a game performance satisfactorily.

The present invention is not limited to the above-described embodiments, and variations and modifications may be made without departing from the scope of the present invention.

The present application is based upon and claims the benefit of priority of Japanese patent application No. 2005-197343, filed on Jul. 6, 2005, the entire contents of which are incorporated by reference.

What is claimed is:

1. A computer program computer-readably stored in a memory unit which, when executed by a computer having a processing unit, causes the computer having the processing unit to perform a video game control process of a video game wherein a game object moves through a plurality of paths in response to instructions by a player operating an input unit connected to the computer having the processing unit, the video game control process comprising:
    allowing the player to designate a destination which the player intends to cause the game object to reach;
    detecting a path from a current location of the game object to the designated destination and controlling the game object to move from the current location of the game object toward the designated destination;
    if the path detected from the current location of the game object includes a branch, displaying preceding-branch-direction indications in advance before the game object reaches a branch point, and enabling the player to select, in advance before the game object reaches the branch point, one of the preceding-branch directions for the branch point; and
    when the game object has reached the branch point, controlling the game object to move along the selected branch direction unless an instruction for selecting a branch direction different from the selected branch direction is given by the player for the branch point.

2. The computer program according to claim 1, wherein the program is further configured to cause the computer having the processing unit to perform allowing the player to cancel the branch direction already selected in advance and to change to another branch direction.

3. The computer program according to claim 1, wherein the video game control process further comprises displaying forward/backward direction indications; and enabling the player to select one of forward and backward directions of the game object.

4. The computer program according to claim 3, wherein, when one of the forward/backward direction indications opposite to a direction of movement of the game object is selected, the direction of the movement is reversed and the branch direction selected in advance for the branch point on the following path is canceled.

5. The computer program according to claim 1, wherein the video game control process further comprises displaying a stop-mark indication enabling the player to stop and restart movement of the game object.

6. The computer program according to claim 1, wherein the video game control process further comprises displaying a free-movement-area indication enabling the player to control the game object to move toward a selected one of a plurality of free-movement directions in a free-movement area on the path.

7. A video game device which is configured to perform a video game control process of a video game wherein a game object moves through a plurality of paths in response to instruction by a player who operates an input means connected to the game device, comprising:
    allowing the player to designate a destination which the player intends to cause the game object to reach with the input means;
    detecting a path from a current location of the game object to the designated destination and controlling the game object to move from the current location of the game object toward the designated destination;
    if the path detected from the current location of the game object includes a branch, displaying preceding-branch-direction indications in advance before the game object reaches a branch point, and enabling the player to select, in advance before the game object reaches the branch point, one of the preceding-branch directions for the branch point; and
    when the game object has reached the branch point, controlling the game object to move along the selected branch point, controlling the game object to move along the selected branch direction unless an instruction for selecting a branch direction different from the selected branch is given by the player for the branch point.

8. A computer program computer-readably stored in a memory unit which, when executed by a computer having a processing unit, causes the computer having the processing unit to perform a video game control process of a video game wherein a game object moves through a path including a plurality of branches in response to instructions by a player who operates an input unit connected to the computer, the video game control process comprising:
    allowing the player to designate a destination which the player intends to cause the game object to reach;
    detecting a path from a current location of the game object to the designated destination and controlling the game object to move from the current location of the game object toward the designated destination;
    if the path detected from the current location of the game object includes a plurality of branches, displaying preceding-branch-direction indications in advance for the respective branches before the game object reaches a branch point;

allowing the player to select, in advance before the game object reaches the branch point, one of the preceding-branch directions for the respective branch point; and controlling the game object to move toward the designated destination along the selected preceding-branch direction.

\* \* \* \* \*